United States Patent
Russo

[11] 3,828,983
[45] Aug. 13, 1974

[54] MIXING AND DISPENSING DEVICE
[76] Inventor: Leonard Russo, 177 Canal St., Apt. 18, San Rafael, Calif. 94901
[22] Filed: Dec. 6, 1971
[21] Appl. No.: 209,898

[52] U.S. Cl................. 222/190, 222/518, 137/268, 23/267 A, 23/272.7
[51] Int. Cl............................................ B67d 5/58
[58] Field of Search .......... 222/135, 136, 145, 190, 222/193, 129.4, 129.3, 518; 239/310, 315, 379, 567; 137/268; 23/267 A, 267 B, 267 C, 267 D, 267 E, 267 F, 272.7, 272.8

[56] References Cited
UNITED STATES PATENTS

| 341,066 | 5/1886 | Smith | 222/157 X |
| 1,788,779 | 1/1931 | Regester | 239/567 X |
| 2,554,480 | 5/1951 | Morton | 137/268 X |
| 2,606,699 | 8/1952 | Andricks | 222/518 UX |
| 2,609,232 | 9/1952 | Taulman | 239/310 X |
| 2,757,047 | 7/1956 | Friedmann | 137/268 |
| 2,871,058 | 1/1959 | Puglia | 222/190 X |
| 3,671,020 | 6/1972 | Krupp | 222/129.4 X |

Primary Examiner—Drayton E. Hoffman
Assistant Examiner—Joseph J. Rolla
Attorney, Agent, or Firm—Townsend and Townsend

[57] ABSTRACT

A device, including a mixing chamber, that is adapted to be positioned in a water line between the water source and a dispersion mechanism such as a sprinkler. The device includes a manually operable mechanism for introducing a measured amount of chemical into a normally fluid-tight mixing chamber. The inflow of water is simultaneously dispersed into and agitated within the mixing chamber and the outflow of water restricted so that undissolved chemicals are not allowed to flow out with the irrigation water.

4 Claims, 3 Drawing Figures

PATENTED AUG 13 1974                                    3,828,983

MIXING AND DISPENSING DEVICE

BACKGROUND OF THE INVENTION

This invention relates to apparatus for mixing chemical fertilizers and/or soil conditioners with a liquid such as water used in the irrigation of growing plants.

The conventional practice is to scatter the dry, powdered or granulated chemical over the area to be treated, either by hand or with mechanical assistance, before irrigation water is applied. This method results in the dry chemical adhering to the tender leaves and grass blades so that when the water is applied, chemical action commences at these tender leaves and stems, with attendant damage (termed "fertilizer burn") to the growing plants before the water can dissolve the chemical and transfer it into the soil where it is able to reach the plant roots for which it is intended.

The present invention provides a device, including a mixing chamber, that is adapted to be positioned in the water line between the water source and a dispersion mechanism such as a sprinkler. The device includes a manually operable mechanism for introducing a measured amount of chemical into a normally fluid-tight mixing chamber. The device is constructed so that the inflow of water is simultaneously dispersed into and agitated within the mixing chamber and the outflow of water restricted so that undissolved chemicals are not allowed to flow out with the irrigation water.

In more detail, the mixing chamber is provided with a graduated feed hopper for measuring a predetermined amount of chemical for each irrigation setting. Still further, the device is provided with an inlet nozzle of a configuration especially designed for agitating the liquid and enhancing the rate of dissolution of the chemical so as to accomplish the required degree of distribution of chemical with a given amount of water.

BRIEF DESCRIPTION OF THE DRAWINGS

A better understanding of the invention will be gained by reference to the following description of the drawings. In the drawings.

DESCRIPTION OF THE PREFERRED EMBODIMENT

Figure 1:
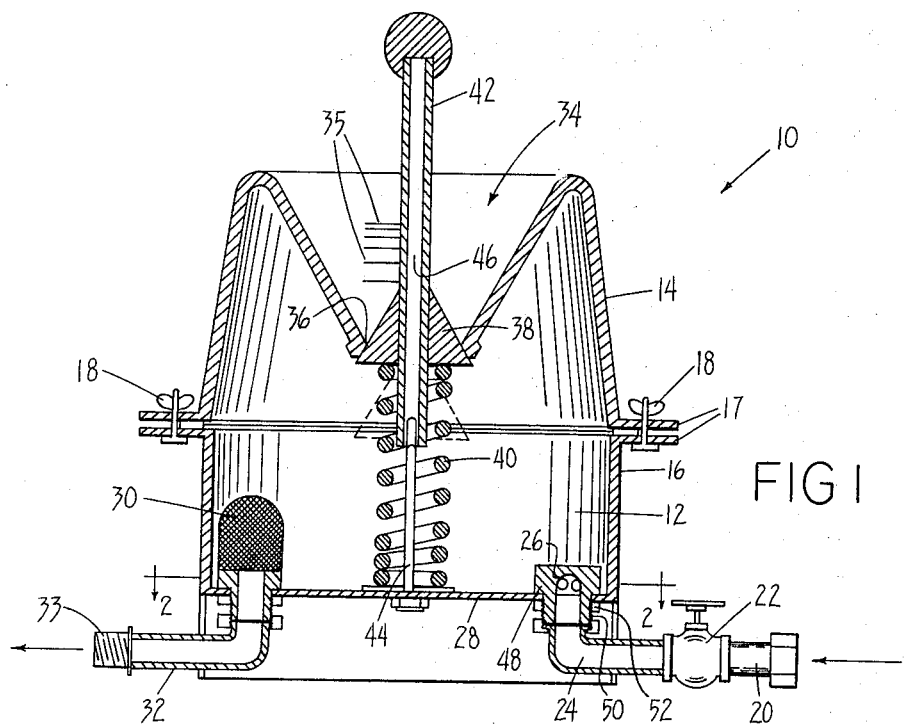
FIG. 1 is a vertical cross-sectional view depicting the relative positions of the component parts of one embodiment of this invention
Figure 2:
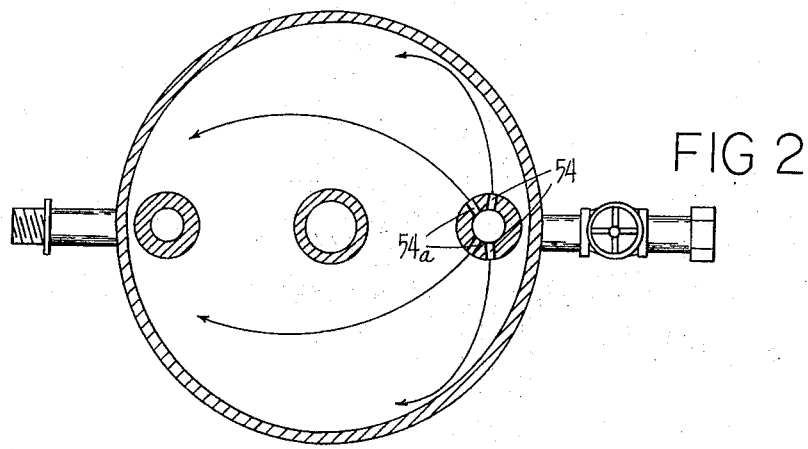
FIG. 2 is a view taken in section on line 2—2 of FIG. 1.

Referring to the drawings, wherein similar characters of reference represent corresponding parts in each of the several views, the reference numeral 10 indicates generally the device, as a whole, comprising mixing chamber 12, preferably cylindrical in general configuration, formed with an upper section 14 and a lower section 16. Each section has outwardly extending, circumferential flanges 17 designed for abutting engagement. Aligned openings in flanges 17 are provided for insertion of an appropriate number of wing nuts 18 to enable the sections to be secured together in water-tight association.

Water is introduced into mixing chamber 12 through conduit 20 from a conventional source of water (not shown). Ball valve 22, for example, is utilized to control the quantity and extent of flow of water into pipe 24 and through inlet nozzle 26 mounted in bottom 28 of lower section 16.

Discharge from the mixing chamber 12 is accomplished through outlet pipe 32 mounted through bottom 28 of lower section 16. Advantages are gained by providing screen 30 enclosing the end of outlet pipe 32 to prevent egress of undissolve particles of chemical. Outlet pipe 32 is connected to dispensing means such as a hose (not shown) in a conventional manner such as by threads 33.

Upper section 14 is provided with a funnel-shaped, conical depression 34, the outer surface of which is provided with a series of gradations 35 indicating the amount of material present in the conical depression. Conical depression 34 includes an opening 36 at its lowermost extremity, generally circular in cross section, which is closed by an outwardly tapering correspondingly shaped, conical stop valve 38 within chamber 12 and resiliently biased outwardly so as to be maintained in fluid-tight engagement with opening 36 through the urging of compression spring 40. Valve 38 is further mounted on tubular valve plunger 42. Guide member 44, slightly smaller in cross section than bore 46 of valve plunger 42 is secured to bottom 28 in axial alignment with compression spring 40 and bore 46 of valve plunger 42, so as to provide a guide along which plunger 42, carrying conical stop valve 38 can be depressed so as to unblock opening 36 and allow flowable substances in funnel-shaped depression 34 to pass into mixing chamber 12.

Figure 3:
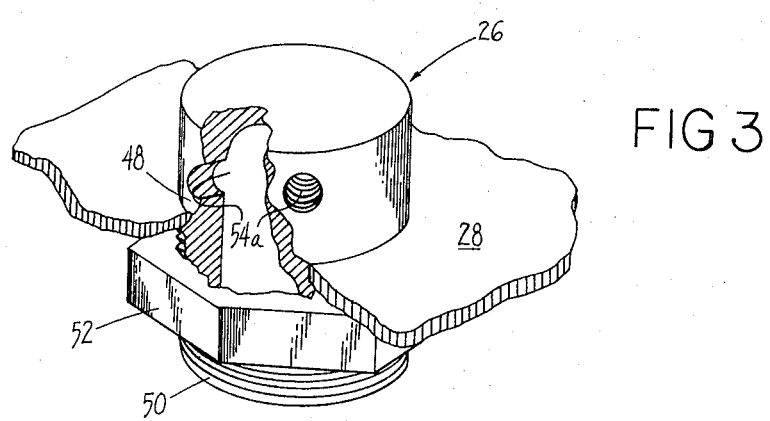
FIG. 3 is a perspective view of the nozzle head of the embodiment of FIG. 1.

Nozzle 26, seen most clearly in FIG. 3, is formed with shoulder 48 and threaded neck 50. Threaded neck 50 is inserted through an appropriately sized opening in bottom 28 and drawn into fluid-tight engagement therewith by nut 52. Nozzle 26 is thereafter attached in the conventional manner to inlet pipe 24. Nozzle 26 includes a plurality of openings 54 and 54a having a total cross section substantially less than the cross section of inlet pipe 24, each opening being generally normal to the axial alignment of the liquid flow path within nozzle neck 50. The openings are directed so as to create a swirling agitated flow (spray) of water into the chamber to thereby enhance the rate of dissolution of the powdered (or granular) chemical substances introduced therein. Thus, two of the openings 54 direct the fluid generally tangentially to the internal surface of chamber 12 while other openings 54a direct the water randomly into the central area of mixing chamber 12.

In operation, the prerequisite amount of flowable chemical substance is introduced into funnel-shaped depression 34. Valve plunger 42 is depressed allowing the chemical substance to gravitationally flow into mixing chamber 12. Valve 22 is then opened to allow water to swirl out through inlet nozzle 26 in chamber 12 wherein the chemical substance is caused to be dissolved in and uniformly mixed with the incoming swirling liquid during its holding time with mixing chamber 12. Thereafter, the chemical containing liquid is discharged out of outlet pipe 32. In this manner, only that amount of chemical substance which dissolves in the liquid is allowed to pass out for distribution on the plants or foliage being treated.

It will be understood that variations and departures from the specific embodiment of the invention illus-

What is claimed is:

1. A device for mixing a soluble substance with a flowing stream of water, comprising: a mixing chamber of circular cross section having an upper section and lower section, said upper section including a concave depression, terminating in a circular opening for forming a pre-induction holding zone for said soluble substance, said concave depression including indicia displayed thereon for measuring the quantity of flowable substance therein, means for introducing said soluble substance into said mixing chamber including within said mixing chamber a depressible conically shaped element outwardly spring biased to seat in fluid-tight engagement with the opening in said concave depression and allow introduction of said soluble substance into said mixing chamber only when said conically shaped element is depressed; means in said lower section for supplying liquid to said mixing chamber, said liquid supplying means including a nozzle located adjacent one side of said chamber, said nozzle having a plurality of openings of lesser total cross section than said liquid supplying means for distorting the flow of said liquid within said mixing chamber to cause agitation thereof and thereby enhance the rate of dissolution of said soluble substance in said liquid; and means in said lower section for removing said substance-containing water from said mixing zone, said removing means located adjacent a side of said chamber diametrically opposite said nozzle.

2. A device in accordance with claim 1 wherein said removal means includes a strainer having openings therein adapted to prevent egress of solid particles of soluble substance.

3. A device in accordance with claim 1 wherein at least one of said plurality of openings is formed to direct liquid tangentially to the wall of said mixing zone.

4. A device in accordance with claim 1 wherein at least one of said plurality of openings is formed to direct liquid inwardly of the wall of said mixing zone.

* * * * *